United States Patent
Cozma et al.

(10) Patent No.: US 12,010,112 B2
(45) Date of Patent: Jun. 11, 2024

(54) REMOTE SECURED CONSOLE OVER A SECURED CONNECTION FOR INOPERABLE VIRTUAL MACHINE

(71) Applicant: Lenovo Global Technology (United States) Inc., Morrisville, NC (US)

(72) Inventors: Alexandru Cozma, Bucharest (RO); Jeffery J Van Heuklon, Rochester, MN (US); Ioana Voicu, Bucharest (RO); Ionut Dobre, Bucharest (RO)

(73) Assignee: Lenovo Global Technology (United States) Inc., Morrisville, NC (US)

( * ) Notice: Subject to any disclaimer, the term of this patent is extended or adjusted under 35 U.S.C. 154(b) by 337 days.

(21) Appl. No.: 17/706,165

(22) Filed: Mar. 28, 2022

(65) Prior Publication Data

US 2023/0308434 A1   Sep. 28, 2023

(51) Int. Cl.
*H04L 9/40* (2022.01)
*G06F 9/455* (2018.01)

(52) U.S. Cl.
CPC ...... *H04L 63/0853* (2013.01); *G06F 9/45558* (2013.01); *H04L 63/083* (2013.01); *G06F 2009/45587* (2013.01); *G06F 2009/45595* (2013.01)

(58) Field of Classification Search
CPC . G06F 2009/45587; G06F 2009/45595; G06F 21/33; G06F 9/45512; G06F 9/45558; G06F 2009/45591; H04L 63/083; H04L 63/0853; H04L 63/0884; H04L 63/0876; H04L 63/0892; H04L 63/0869; H04L 63/108
See application file for complete search history.

(56) References Cited

U.S. PATENT DOCUMENTS

| | | | |
|---|---|---|---|
| 10,063,644 B1 * | 8/2018 | Pai | H04L 67/51 |
| 10,298,720 B1 * | 5/2019 | Miller | H04L 67/01 |
| 10,511,584 B1 * | 12/2019 | Baer | H04L 63/029 |

(Continued)

OTHER PUBLICATIONS

Voron, "Control a desktop app through web with Websockets", Medium, Dec. 13, 2018, downloaded on Jun. 14, 2022, pp. 1-7.

(Continued)

*Primary Examiner* — Greg C Bengzon
(74) *Attorney, Agent, or Firm* — Kunzler Bean & Adamson; Bruce R. Needham (57) ABSTRACT

A method for creation of a secured connection for an inoperable virtual machine includes receiving a token at an on-host service running on an inoperable virtual machine ("VM") on a server. The token is generated by a remote service person. The method includes receiving a user generated password from a user having direct access to the on-host service. The method includes creating a secured connection, using the token and password, between the on-host service and a remote server of the service person. The method includes transmitting a VM identifier of the inoperable VM to the user and receiving communications from the remote server. The communications include commands for the inoperable VM. The service person accesses the on-host service and inoperable VM using the VM identifier and the password. The password and VM identifier are transmitted to the service person by the user via a channel separate from the secured connection.

17 Claims, 5 Drawing Sheets

(56) References Cited

U.S. PATENT DOCUMENTS

| | | | |
|---|---|---|---|
| 11,363,012 B1* | 6/2022 | Chhabra | H04L 9/0894 |
| 11,381,584 B1* | 7/2022 | Victor | G06F 9/45558 |
| 11,750,475 B1* | 9/2023 | Gonzalez | H04L 41/5032 |
| 2007/0101405 A1* | 5/2007 | Engle | H04L 63/20 |
| | | | 709/225 |
| 2010/0242038 A1* | 9/2010 | Berrange | G06F 21/445 |
| | | | 718/1 |
| 2012/0096271 A1* | 4/2012 | Ramarathinam | H04L 63/168 |
| | | | 709/227 |
| 2015/0242236 A1* | 8/2015 | Nakazono | G06F 11/3055 |
| | | | 718/1 |
| 2015/0244710 A1* | 8/2015 | Koster | H04L 9/083 |
| | | | 713/171 |
| 2016/0063367 A1* | 3/2016 | Cai | G06Q 10/10 |
| | | | 235/494 |
| 2016/0182487 A1* | 6/2016 | Zhu | H04L 63/083 |
| | | | 726/9 |
| 2016/0182525 A1* | 6/2016 | Zhu | H04L 63/20 |
| | | | 726/1 |
| 2018/0247082 A1* | 8/2018 | Durham | G06F 21/53 |
| 2018/0255021 A1* | 9/2018 | Pellizzer | G06F 21/62 |
| 2018/0367528 A1* | 12/2018 | Schwarz | H04L 63/0807 |
| 2019/0044793 A1* | 2/2019 | Chew | H04L 41/0672 |
| 2019/0068622 A1* | 2/2019 | Lin | H04L 63/1441 |
| 2019/0220359 A1* | 7/2019 | Srinivasan | G06F 11/142 |
| 2019/0349338 A1* | 11/2019 | Frost | G06F 9/452 |
| 2020/0004566 A1* | 1/2020 | Maxilom | G06F 9/44536 |
| 2021/0224091 A1* | 7/2021 | Hayatnagarkar | G06F 16/955 |
| 2022/0006805 A1* | 1/2022 | Kulkarni | H04L 67/1097 |
| 2022/0019698 A1* | 1/2022 | Durham | G06F 21/71 |
| 2022/0272163 A1* | 8/2022 | Schuller | H04L 67/51 |

OTHER PUBLICATIONS

"HTML5 Remote Desktop Servers", http://remotedesktoprdp.com/remote-desktop-servers/html5, known about as early as Dec. 3, 2021, downloaded on May 13, 2022, pp. 1-2.

* cited by examiner

REMOTE SECURED CONSOLE OVER A SECURED CONNECTION FOR INOPERABLE VIRTUAL MACHINE

FIELD

The subject matter disclosed herein relates to communication with an inoperable virtual machine and more particularly relates to a remote secured console over a secured connection for an inoperable virtual machine.

BACKGROUND

In certain situations a customer with servers running virtual machines contacts support personnel because a virtual machine is unavailable due to issues within the virtual machine. Often virtual machines are closed with a closed console and there is no backdoor into the virtual machine. The support personnel find themselves in an unpleasant situation of doing a remote call with the customer in which the service personnel have to mount a live compact disk ("CD"), (a bootable computer installation including an operating system that runs directly from a CD), mount the hard disk drive of the unresponsive virtual machine in the live CD, and then debug issues. Such operations often take a lot of time to make the configuration and often many of the customers don't have the necessary rights to software and the service personnel may spent 1-2 hours to debug a problem. In the end the customer is frustrated, which does not reflect well on the service personnel. Other options, such as a Remote Desktop Service in the virtual machine, create security issues by creating a backdoor. Having the service personnel do the debugging at the customer location is often unacceptable due to travel time.

BRIEF SUMMARY

A method for creation of a remote secured console over a secured connection for an inoperable virtual machine is disclosed. An apparatus and computer program product also perform the functions of the method. The method includes receiving a token at an on-host service running on an inoperable virtual machine ("VM") running on a server. The token is generated by a service person located remote from the server. The method includes receiving, at the on-host service, a password from a user where the user has direct access to the on-host service. The password is generated by the user. The method includes creating, by the on-host service, a secured connection between the on-host service and a remote server accessible to the service person. The secured connection is created using the token and the password. The method includes transmitting a VM identifier of the inoperable VM to the user, and receiving communications from the remote server. The communications include one or more commands directed to the inoperable VM. The service person accesses the on-host service and the inoperable VM using the VM identifier and the password. The password and the VM identifier are transmitted to the service person by the user via a channel separate from the secured connection.

An apparatus for creation of a remote secured console over a secured connection for an inoperable virtual machine includes a processor and non-transitory computer readable storage media storing code. The code is executable by the processor to perform operations that include receiving a token at an on-host service running on an inoperable VM running on a server. The token is generated by a service person located remote from the server. The operations include receiving, at the on-host service, a password from a user. The user has direct access to the on-host service. The password is generated by the user. The operations include creating, by the on-host service, a secured connection between the on-host service and a remote server accessible to the service person. The secured connection is created using the token and the password. The apparatus includes transmitting a VM identifier of the inoperable VM to the user and receiving communications from the remote server. The communications include one or more commands directed to the inoperable VM. The service person accesses the on-host service and the inoperable VM using a VM identifier and the password. The password and the VM identifier are transmitted to the service person by the user via a channel separate from the secured connection.

A program product for creation of a remote secured console over a secured connection for an inoperable virtual machine includes a non-transitory computer readable storage medium storing code. The code is configured to be executable by a processor to perform operations that include receiving a token at an on-host service running on an inoperable VM running on a server. The token is generated by a service person located remote from the server. The operations include receiving, at the on-host service, a password from a user. The user has direct access to the on-host service. The password is generated by the user. The operations include creating, by the on-host service, a secured connection between the on-host service and a remote server accessible to the service person. The secured connection is created using the token and the password. The operations include transmitting a VM identifier of the inoperable VM to the user and receiving communications from the remote server. The communications include one or more commands directed to the inoperable VM. The service person accesses the on-host service and the inoperable VM using the VM identifier and the password where the password and the VM identifier are transmitted to the service person by the user via a channel separate from the secured connection.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices, in some embodiments, are tangible, non-transitory, and/or non-transmission. The storage devices, in some embodiments, do not embody signals.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution H system, apparatus, or device.

Code for carrying out operations for embodiments may be written in any combination of one or more programming languages including an object oriented programming language such as Python, Ruby, R, Java, Java Script, Smalltalk, C++, C N sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The embodiments may transmit data between electronic devices. The embodiments may further convert the data from a first format to a second format, including converting the data from a non-standard format to a standard format and/or converting the data from the standard format to a non-standard format. The embodiments may modify, update, and/or process the data. The embodiments may store the received, converted, modified, updated, and/or processed data. The embodiments may provide remote access to the data including the updated data. The embodiments may make the data and/or updated data available in real time. The embodiments may generate and transmit a message based on the data and/or updated data in real time.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C.

A method for creation of a remote secured console over a secured connection for an inoperable virtual machine is disclosed. An apparatus and computer program product also perform the functions of the method. The method includes receiving a token at an on-host service running on an inoperable virtual machine ("VM") running on a server. The token is generated by a service person located remote from the server. The method includes receiving, at the on-host service, a password from a user where the user has direct access to the on-host service. The password is generated by the user. The method includes creating, by the on-host service, a secured connection between the on-host service and a remote server accessible to the service person. The secured connection is created using the token and the password. The method includes transmitting a VM identifier of the inoperable VM to the user, and receiving communications from the remote server. The communications include one or more commands directed to the inoperable VM. The service person accesses the on-host service and the inoperable VM using the VM identifier and the password. The password and the VM identifier are transmitted to the service person by the user via a channel separate from the secured connection.

In some embodiments, creating the secured connection includes using web proxy information regarding a web proxy between the inoperable VM and the remote server to create the secured connection. In other embodiments, the secured connection is a WebSocket. In other embodiments, the token is unique to the secured connection and the on-host service and the remote server use the token to encrypt communications over the secured connection. In other embodiments, the method includes storing a hash of previous passwords and rejecting the password generated by the user in response to a hash of the password matching a hash of a previous password.

In some embodiments, the service person accesses the remote server via a web browser accessing a webpage hosted by the remote server. In other embodiments, the channel separate from the secured connection includes a voice connection and/or an electronic message. In other embodiments, the service person transmits the token to the user and the user inputs the token to the on-host service. The service person transmits the token using a voice connection and/or an electronic message. In other embodiments, the method includes terminating the secured connection in response to reaching a time limit and/or reaching a time limit after a period inactivity on the secured connection. In other embodiments, the user accesses the on-host service via a user interface through the server.

An apparatus for creation of a remote secured console over a secured connection for an inoperable virtual machine includes a processor and non-transitory computer readable storage media storing code. The code is executable by the processor to perform operations that include receiving a token at an on-host service running on an inoperable VM running on a server. The token is generated by a service person located remote from the server. The operations include receiving, at the on-host service, a password from a user. The user has direct access to the on-host service. The password is generated by the user. The operations include creating, by the on-host service, a secured connection between the on-host service and a remote server accessible to the service person. The secured connection is created using the token and the password. The apparatus includes transmitting a VM identifier of the inoperable VM to the user and receiving communications from the remote server. The communications include one or more commands directed to the inoperable VM. The service person accesses the on-host service and the inoperable VM using a VM identifier and the password. The password and the VM identifier are transmitted to the service person by the user via a channel separate from the secured connection.

In some embodiments, creating the secured connection includes using web proxy information regarding a web proxy between the inoperable VM and the remote server to create the secured connection. In other embodiments, the secured connection is a WebSocket. In other embodiments, the token is unique to the secured connection and the on-host service and the remote server use the token to encrypt communications over the secured connection. In other embodiments, the operations include storing a hash of previous passwords and rejecting the password generated by the user in response to a hash of the password matching a hash of a previous password. In other embodiments, the service person accesses the remote server via a web browser accessing a webpage hosted by the remote server.

In some embodiments, the channel separate from the secured connection includes a voice connection and/or an electronic message and the service person transmits the token to the user and the user inputs the token to the on-host service. The service person transmits the token using a voice connection and/or an electronic message. In other embodiments, the operations include terminating the secured connection in response to reaching a time limit and/or reaching a time limit after a period inactivity on the secured connection.

A program product for creation of a remote secured console over a secured connection for an inoperable virtual machine includes a non-transitory computer readable storage medium storing code. The code is configured to be executable by a processor to perform operations that include receiving a token at an on-host service running on an inoperable VM running on a server. The token is generated by a service person located remote from the server. The operations include receiving, at the on-host service, a password from a user. The user has direct access to the on-host service. The password is generated by the user. The operations include creating, by the on-host service, a secured connection between the on-host service and a remote server accessible to the service person. The secured connection is created using the token and the password. The operations include transmitting a VM identifier of the inoperable VM to the user and receiving communications from the remote server. The communications include one or more commands directed to the inoperable VM. The service person accesses the on-host service and the inoperable VM using the VM identifier and the password where the password and the VM identifier are transmitted to the service person by the user via a channel separate from the secured connection.

In some embodiments, creating the secured connection includes using web proxy information regarding a web proxy between the inoperable VM and the remote server to create the secured connection.

Figure 1:
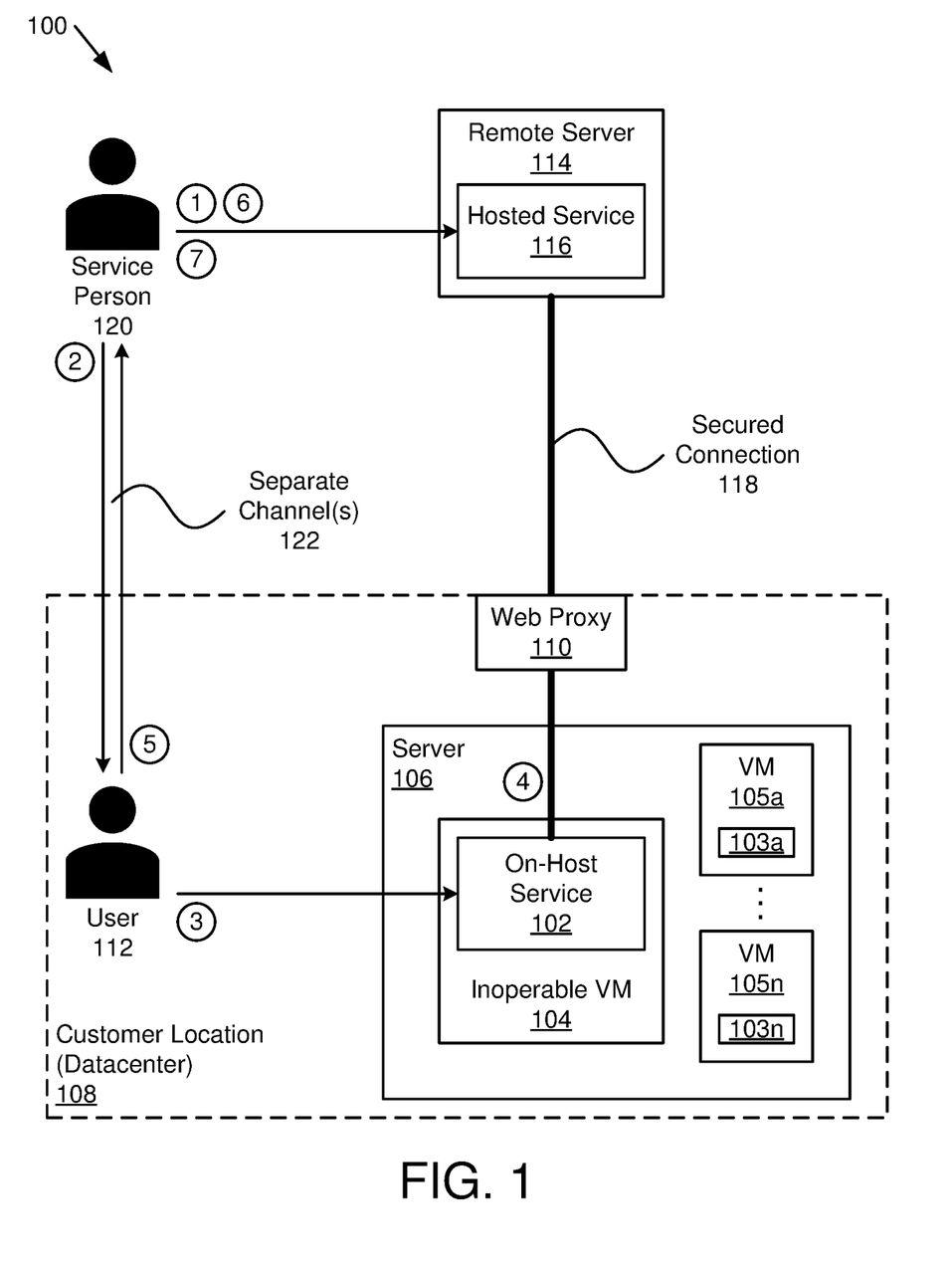
FIG. 1 is a schematic block diagram illustrating a system for creation of a remote secured console over a secured connection for an inoperable virtual machine ("VM"), according to various embodiments.

FIG. 1 is a schematic block diagram illustrating a system 100 for creation of a remote secured console over a secured connection for an inoperable VM, according to various embodiments. The system 100 includes an on-host service 102a in an inoperable VM 104 along with other VMs 105a-n with on-host services 103a-n in a server 106 at a customer location 108, a web proxy 110, a user 112, a remote server 114, a hosted service 116, a secured connection 118, a service person 120, and separate channel(s) 122, which are described below.

The on-host services 102, 103a-n (generically or collectively "103"), in some embodiments, are a light-weight service running on a VM 104, 105a-n (generically or collectively "105") on a server 106. Each on-host service 102, 103 is designed to allow communication with a VM 104, 105 when the VM 104, 105 is inoperable. The on-host service 102, 103 allows a user 112 or service person 120 to interact with an inoperable VM 104 to run commands, diagnostics, to reboot the inoperable VM 104, to view logs of the inoperable VM 104, to debug applications and files, and other useful interactions with the inoperable VM 104 to attempt to correct issues with the inoperable VM 104. The on-host services 102, 103 are described in more detail below with respect to the apparatuses 200, 300 of FIGS. 2 and 3.

A virtual machine 104, 105 is a virtual computer or software-defined computer that is running on a server 106 or other computing device. A virtual machine has its own instance of an operating system and accesses processors, memory, storage devices, and other resources of the server. Virtual machines are often used in datacenters to provide separation and security between clients. For example, a cloud service of a customer may offer various computing service to clients where the clients desire security. By each VM having a separate instance of an operating system, workloads of the clients enjoy a degree of separation from other clients. One of skill in the art will recognize other characteristics of a VM.

A VM 104 may become inoperable, which often requires a service person 120 to get involved in getting the inoperable VM 104 functioning again. As used herein, an inoperable VM 104 is in operable in some aspect requiring a service person 120 to access the inoperable VM 104 to diagnose problems, execute commands, etc. in an attempt to get the inoperable VM 104 operational. In some embodiments, the inoperable VM 104 is not reachable directly without the on-host service 102 running on the inoperable VM 104. In other embodiments, the inoperable VM 104 is frozen, is unresponsive, or otherwise in a state such that access is required to diagnose and resolve the inoperability of the inoperable VM 104. Often, the server 106 has an inoperable VM 104 while other VMs 105 continue to operate normally.

Often a customer location 108 is a datacenter that includes multiple servers 106 owned by another entity ("owner"). Often the customer has a subscription agreement for the servers 106, leases the servers 106, etc. from the owner.

Often a customer has some type of support agreement for servers 106 where the support is provided by the owner. In other embodiments, the customer owns the servers 106 and support is provided by a service provider. The customer may call or contact the owner/service provider for help with an inoperable VM 104 and the owner/service provider may then assign a service person 120 to help the customer with the inoperable VM 104. Typically, it is inconvenient and time consuming to have the service person 120 come to the customer location 108. Having more immediate online help from the service person 120 located remote from the customer location 108 is desirable to more quickly address the inoperable VM 104. A person at the customer location, here termed a "user" 112, is able to communicate with the service person 120 to address the problems with the inoperable VM 104.

A problem that is faced when using a remote service person 120 to help solve problems with an inoperable VM 104 is access to the inoperable VM 104. Security concerns of the customer typically hampers online access of the inoperable VM 104 by the service person 120. A variety of methods have been used, but very often current access methods take an average of about an hour-and-a-half for a service person 120 to gain access to an inoperable VM 104. The on-host service 102 provides a convenient connection method that allows the service person 120 access to the inoperable VM 104 quickly with safety mechanisms providing security so that hackers will have an extremely difficult time intercepting communications between the service person 120 and the inoperable VM 104, or somehow using what was done during communications between the service person 120 and inoperable VM 104 to later gain access to the inoperable VM 104 or server 106. The on-host service 102 is described below in more detail with respect to the apparatuses 200, 300 of FIGS. 2 and 3.

In some embodiments, the customer location 108 includes a web proxy 110 that acts as a limited gateway between servers 106 at the customer location 108 and the outside world. The web proxy 110, in some embodiments, acts as a firewall that allows communications with trusted sources. In some embodiments, the web proxy 110 runs on a web proxy server. In some embodiments, the customer uses the web proxy 110 for cybersecurity. In some examples, the web proxy 110 anonymizes internal internet protocol ("IP") addresses. In other examples, the customer uses the web proxy 110 for performance reasons. For example, the web proxy 110 caches content for better data transfer speeds and less bandwidth usage. The customer, in some embodiments, uses the web proxy 110 to filter out content that should not be downloaded to the servers 106. The web proxy 110 acts as an intermediary between the web and devices at the customer location 108. In some embodiments, the customer location 108 does not use a web proxy 110. One of skill in the art will recognize other features and advantages of a web proxy 110.

The service person 120 connects to the inoperable VM 104 from a remote server 114 or other computing device, which may run a hosted service 116. In some examples, the service person 120 accesses a website or webpage of the hosted service 116 from a computing device at the location of the service person 120 where the remote server 114 is at a location different from the service person 120. In some examples, the remote server 114 is at the location of the owner. In other examples, the remote server 114 is provided by a web hosting company and the owner contracts with the hosting company to run the hosted service 116 as a means to connect the service person 120 with the inoperable VM 104. In other embodiments, the remote server 114 is accessed directly by the service person 120. In some embodiments, the hosted service 116 is created by the owner or service provider to facilitate communication between the service person 120 and the inoperable VM 104. The service person 120, in some embodiments, accesses the remote server 114 directly to get to the hosted service 116.

In some embodiments, the service person 120 accesses the on-host service 102 via the hosted service 116 running on the remote server 114 and over a secured connection 118 and through the web proxy 110. In other embodiments, service person 120 accesses the on-host service 102 through the remote server 114 over the secured connection 118 directly without a web proxy 110, for example, where customer does not use a web proxy 110. The secured connection 118 is described in more detail with regards to the apparatuses 200, 300 of FIGS. 2 and 3.

In addition to the secured connection 118, the service person 120 and user 112 communicate over one or more separate channels 122 different than the secured connection 118, such as by phone, text message, email, or the like. The separate channels 122 provide independence from the secured connection 118 for exchange of a token, a password, etc. as described below. The secured connection 118 may include a LAN, a WAN, a public network such as the Internet, or other suitable computer network and may include a combination of networks. Likewise, the separate channels 122 may include a LAN, a WAN, the Internet, a cellular network, or the like. The secured connection 118 and/or separate channels 122 may include a wired connection, a fiber connection, a wireless connection, etc.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM" ®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association@ ("IrDA" ®). Alternatively, the wireless connection may be a cellular telephone network communication. All standards and/or connection types include the latest version and revision of the standard and/or connection type as of the filing date of this application.

Note that the system 100 of FIG. 1 includes numbers that are circled. The circled numbers correspond to embodiments described below regarding establishing the secured connection 118 and communication over the secured connection 118.

Figure 2:
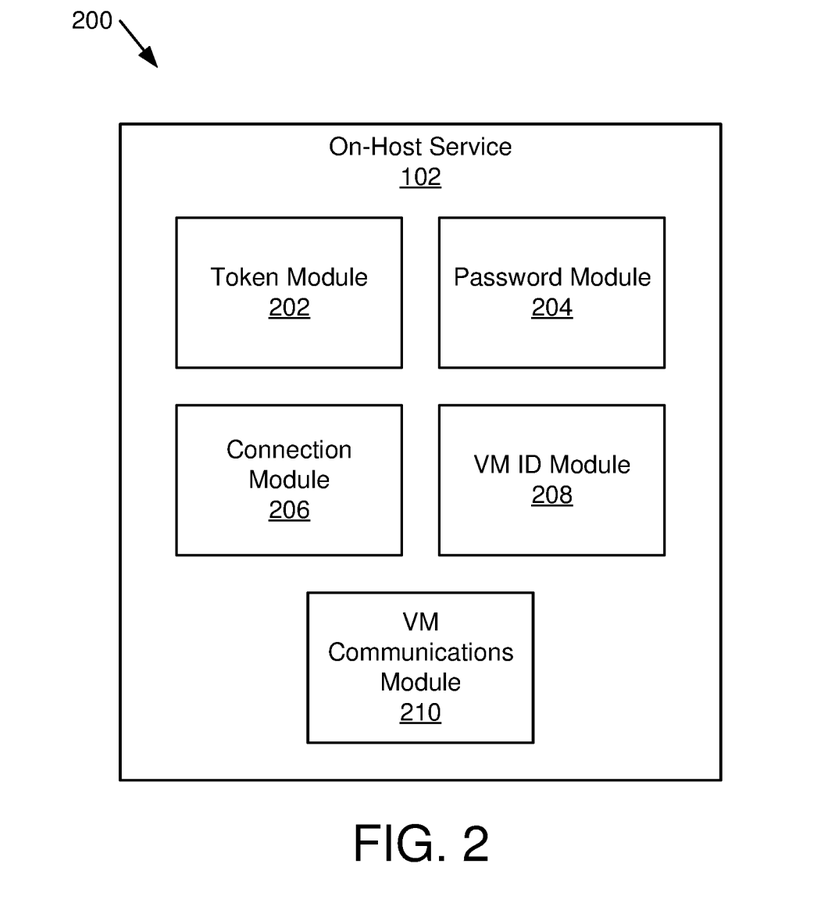
FIG. 2 is a schematic block diagram illustrating an apparatus for creation of a remote secured console over a secured connection for an inoperable VM, according to various embodiments.

FIG. 2 is a schematic block diagram illustrating an apparatus 200 for creation of a remote secured console over a secured connection for an inoperable VM, according to various embodiments. The apparatus 200 includes an on-host service 102 with a token module 202, a password module 204, a connection module 206, a VM identifier module 208, and a VM communications module 210, which are described below. In some embodiments, all or a portion of the apparatus 200 is implemented with executable code stored on computer readable storage media. In some examples, the computer readable storage media is accessible by the server 106 and may include computer readable storage media where files for the inoperable VM 104 are stored. In other embodiments, all or a portion of the apparatus 200 is implemented using a programmable hardware device and/or hardware circuits.

The apparatus 200 includes a token module 202 configured to receive a token at an on-host service 102 running on an inoperable VM 104 running on a server 106. The token is generated by a service person 120 (see "1" on FIG. 1) located remote from the server 106. In some embodiments, the user 112 provides the token to the on-host service 102 (see "3" on FIG. 1). In some embodiments, the on-host service 102 includes a user interface that allows the user 112 to communicate with the on-service host 102 and/or inoperable VM 104. In some embodiments, the token is a sequence of letters, numbers, special characters, or a combination thereof. In other embodiments, the token is a file and may include letters, numbers, etc. or may include code readable by a computer.

In the embodiments, the token may be transmitted from the service person 120 to the user 112 (see "2" on FIG. 1) via the separate channels 122, which may be by a phone call, a text message, an email, or other method separate than the secured connection 118. In some embodiments, the separate channels 122 include a communication pathway different from a communication pathway through which the secured connection 118 will be established. For example, the server 106 may connect to a public network and may connect via a web proxy 110. The separate channels 122 may be over a cellular network or other secured communication method. In some examples, the token is transmitted using email, which may include security, a communication protocol, etc. different from communications between the on-host service 102 and the remote server 114, providing a level of security.

In some embodiments, the token is configured to be used for encryption of communications over the secured connection 118. For example, the token may be used as an encryption key for encrypting communications from the remote server 114 to the on-host service 102 and vice versa. One of skill in the art will recognize other forms and uses of the token.

The apparatus 200 includes a password module 204 configured to receive, at the on-host service 102, a password from a user 112 (see "3" on FIG. 1). The user 112 has direct access to the on-host service 102 and the password is generated by the user 112. The password, in various embodiments, includes a sequence of letters, numbers, special characters, or a combination thereof. In some embodiments, receiving the password from the user 112 includes the on-host host 102 generating one or more passwords and the user 112 selecting the password. Having the user 112 generate the password adds another layer of security by having the user 112 generate the password on the spot during communications with the service person 120, which reduces a possibility that a hacker gaining access to the password since the password has not been stored previously.

The user 112 having direct access to the on-host service 102 includes the user being at the customer location 108 and accessing the on-host service 102, the inoperable VM 104, and/or the server 106 using a keyboard, mouse, electronic display, a terminal, etc. at the customer location 108. In other embodiments, the user 112 is a trusted person that has access to the server 106, the inoperable VM 104 and/or the on-host service 102 via a management network (not shown) or other secure channel available to the user 112. In some embodiments, the user 112 is a system administrator or other person with enough experience, skill, etc. to assist the service person 120 access the inoperable VM 104, assist in gathering information about the inoperable VM 104, etc.

The apparatus 200 includes a connection module 206 configured to create, by the on-host service 102, a secured connection 118 between the on-host service 102 and a remote server 114 accessible to the service person 120 (see "4" on FIG. 1). The secured connection 118 is created using the token and the password. In some embodiments, the on-host service 102 creates the secured connection 118. In other embodiments, the server 106 creates the secured connection 118 as directed by the on-host service 102. As used herein, the secured connection 118 is a connection that provides cybersecurity through encryption, tunneling, etc. to reduce the possibility of a hacker intercepting and reading communications on the secured connection 118.

In some embodiments, the secured connection 118 communicates using encrypted messages using the token. In other embodiments, the secured connection 118 uses a tunneling protocol between the on-host service 102 and/or inoperable VM 104 and the remote server 114. In some embodiments, the secured connection 118 provides full-duplex communication over a transmission control protocol ("TCP") connection. In some embodiments, the secured connection 118 is a WebSocket. In other embodiments, the secured connection 118 uses a Hypertext Transfer Protocol Secure ("HTTPS") connection. In other embodiments, the secured connection 118 uses a different protocol, such as a protocol subsequent to WebSocket and/or HTTPS. One of skill in the art will recognize other ways for the connection module 206 to create the secured connection 118.

The apparatus 200 includes a VM identifier module 208 configured to transmit a VM identifier ("ID") of the inoperable VM 104 to the user 112. In some embodiments, the VM identifier module 208 transmits the VM ID in response to a query from the user 112. Typically, when a VM 104, 105 is created a VM ID is created and assigned to the VM 104, 105. Typically, communications with the VM 104, 105 include the VM ID so that the server 106 knows where to route the communications. In some embodiments, the VM ID is stored in a table accessible to the server 106. In some embodiments, the VM identifier module 208 accesses the table or other location to retrieve the VM ID. In other embodiments, the VM identifier module 208 accesses the VM ID through the inoperable VM 104. One of skill in the art will recognize other ways for the VM identifier module 208 to retrieve and transmit the VM ID to the user 112.

Once the user 112 has the VM ID and the password, the user 112 communicates the VM ID and the password to the service person 120 (see "5" on FIG. 1), which may be done together or separately. The user 112 uses the separate channels 122 to communicate the VM ID and password to the service person 120. Again, the user 112 communicating the VM ID and password via the separate channels 122, which are separate from the secured connection 118 provides a level of security to prevent hackers from intercepting the VM ID and password over the secured connection 118. The service person 120 uses the VM ID and password to connect to and access the on-host service 102 (see "6" on FIG. 1). In some examples, the hosted service 116 provides a gateway to the on-host service 102 requiring at least the VM ID and the password for connection to the on-host service 102. In some examples, the service person 120 logs in to the on-host service 102 using the VM ID and password over the secured connection 118.

The apparatus 200 includes a VM communications module 210 configured to receive communications from the remote server 114 (see "7" on FIG. 1). The communications include one or more commands directed to the inoperable VM 104. The on-host service 102 responds as appropriate to the commands, where possible. In some embodiments, the on-host service 102 translates commands from the remote server 114 to a form compatible with the inoperable VM 104 and inputs the resulting commands to the inoperable VM 104. The on-host server 102, in some embodiments, receives responses from the inoperable VM 104 and transmits the response to the service person 120 via the remote server 114. In other embodiments, the on-host service 102 includes a capability to act on the received commands, to execute the commands, etc. and then to respond appropriately to the service person 120 via the remote server 114. The communications after the secure connection 118 is established allow the service person 120 to communicate with the inoperable VM 104 to run commands, collect data such as log data, debug the issue causing the inoperability of the inoperable VM 104, and ideally to revive the inoperable VM 104 to an operational state. One of skill in the art will recognize other ways for the VM communications module 210 to receive communications from the remote server 114 and to respond appropriately.

Figure 3:
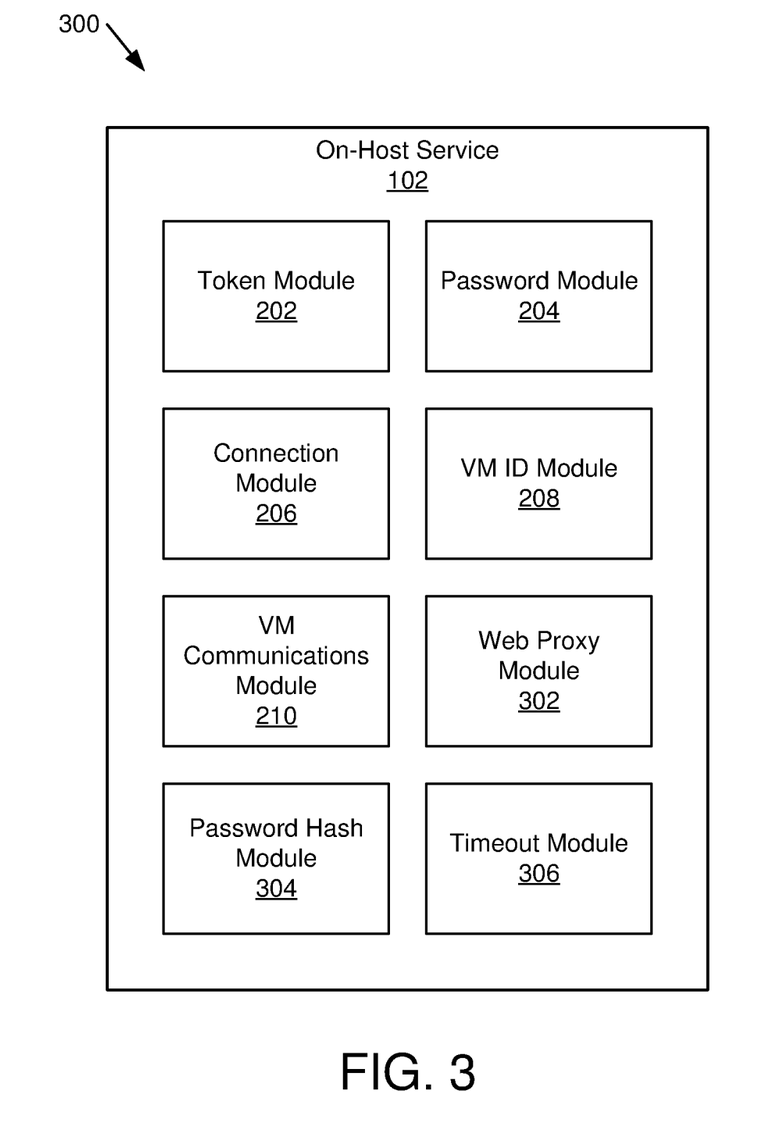
FIG. 3 is a schematic block diagram illustrating another apparatus for creation of a remote secured console over a secured connection for an inoperable VM, according to various embodiments.

FIG. 3 is a schematic block diagram illustrating another apparatus 300 for creation of a remote secured console over a secured connection for an inoperable VM, according to various embodiments. The apparatus 300 includes an on-host service 102 with a token module 202, a password module 204, a connection module 206, a VM identifier module 208, and a VM communications module 210, which are substantially similar to those described above in relation to the apparatus 200 of FIG. 2. In various embodiments, the on-host service 102 also includes a web proxy module 302, a password hash module 304, and/or a timeout module 306, which are described below. In some embodiments, all or a portion of the apparatus 200 is implemented similar to the apparatus 200 of FIG. 2.

The apparatus 300 includes, in some embodiments, a web proxy module 302 configured to provide web proxy information regarding a web proxy 110 between the inoperable VM 104 and the remote server 114 to the connection module 206. The connection module 206 then uses the web proxy information, the token, and the password to create the secured connection 118. In some embodiments, the web proxy module 302 is configured to communicate with the web proxy 110 to get information about the web proxy 110 to enable communication through the web proxy 110 to the remote server 114. In some embodiments, the web proxy module 302 provides website information about the hosted service 116, an address of the remote server 114, or other information to the web proxy 110 so the web proxy 110 allows the secured connection 118 to be created. In some embodiments, the web proxy module 302 relays information to the connection module 206 to enable the connection module 206 to establish the secured connection 118 through the web proxy 110.

The apparatus 300, in some embodiments, includes a password hash module 304 configured to store a hash of previous passwords and rejects a password generated by the user 112 in response to a hash of the password matching a hash of a previous password. A hash is a function that converts one value to another. Hashing data is common in data systems and is used for different purposes, such as for cryptography, compression, checksum generation, etc. In the embodiments described herein, the password hash module 300 uses a hash function with a password as the input to transform the password to a unique data string that represents the password. In some embodiments, a hash of a password is not convertible back to the password.

Storing a hash of previously used passwords provides security so that the actual previous passwords are not stored, but instead just a hash of the previous passwords are stored. The password hash module 304 is then able to determine if the password created by the user 112 matches a previous password. When a hash of the current password matches a hash of a previous password, the current password is assumed to match a previously used password and the password hash module 304 rejects the current password. The user 112 then must select a different password. Thus, the password hash module 304 provides another layer of security so that the user 112 is unable to keep reusing the same password.

The apparatus 300, in some embodiments, includes a timeout module 306. The timeout module 306 is configured to, in some embodiments, terminate the secured connection 118 in response to reaching a time limit. In other embodiments, the timeout module 306 is configured to terminate the secured connection 118 in response to reaching a time limit after a period inactivity on the secured connection 118. In other embodiments, the timeout module 306 is configured to terminate the secured connection 118 in response to reaching a time limit and in response to reaching a time limit after a period inactivity on the secured connection 118. After terminating the secured connection 118, the connection module 206 is able to again create the secured connection 118 and the service person 120 is able to reconnect to the on-host service 102 using the VM ID and the password. The timeout module 306 beneficially limits the time that the secured connection 118 is available to prevent the service person 120 and/or the user 112 from leaving the secured connection 118 open, which provides less of a window for hackers to get in and access communications between the remote server 114 and the on-host service 102.

Figure 4:
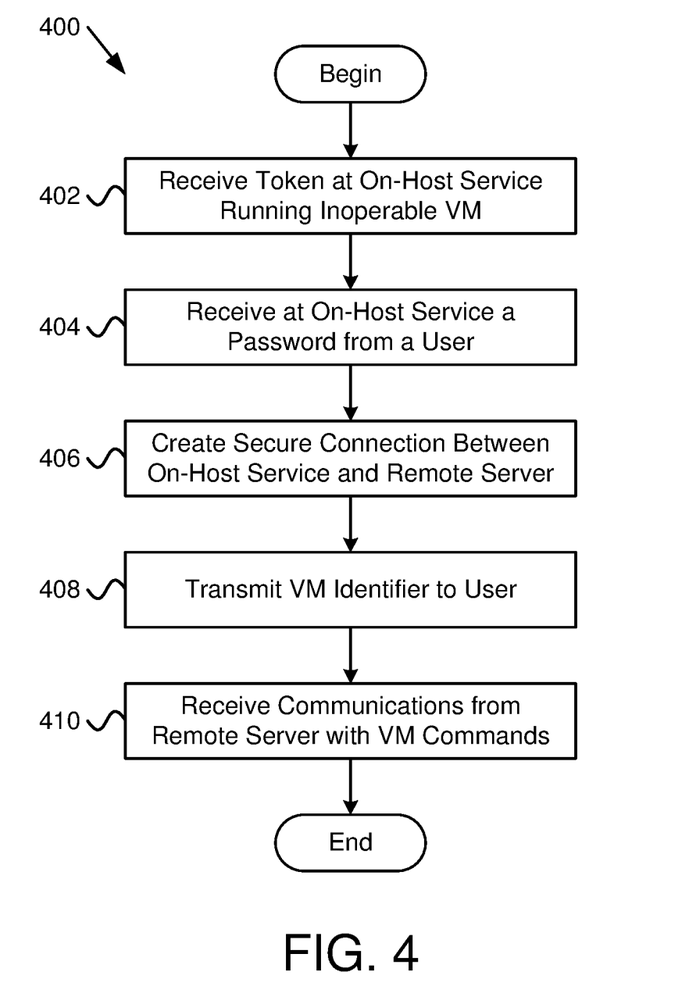
FIG. 4 is a schematic flow chart diagram illustrating a method for creation of a remote secured console over a secured connection for an inoperable VM, according to various embodiments.

FIG. 4 is a schematic flow chart diagram illustrating a method 400 for creation of a remote secured console over a secured connection for an inoperable VM, according to various embodiments. The method 400 begins and receives 402 a token at an on-host service 102 of an inoperable VM 104 running on a processor of a server 106. The token is generated by a service person 120 located remote from the server 106. The method 400 receives 404, at the on-host service 102, a password from a user 112. The user 112 has direct access to the on-host service 102 and the password is generated by the user 112. The method 400 creates 406, by the on-host service 102, a secured connection 118 between the on-host service 102 and a remote server 114 accessible to the service person 120. The method 400 creates 406 the secured connection 118 using the token and the password, and optionally web proxy information.

The method 400 transmits 408 a VM identifier of the inoperable VM 104 to the user 112 and receives 410 communications from the remote server 114, and the method 400 ends. The communications include one or more commands directed to the inoperable VM 104. The service person 120 accesses the on-host service 102 and the inoperable VM 104 using the VM identifier and the password. The password and the VM identifier are transmitted to the service person 120 by the user 112 via a channel separate from the secured connection 118. In various embodiments, all or a portion of the method 400 is implemented using the token module 202, the password module 204, the connection module 206, the VM identifier module 208, and/or the VM communications module 210.

Figure 5:
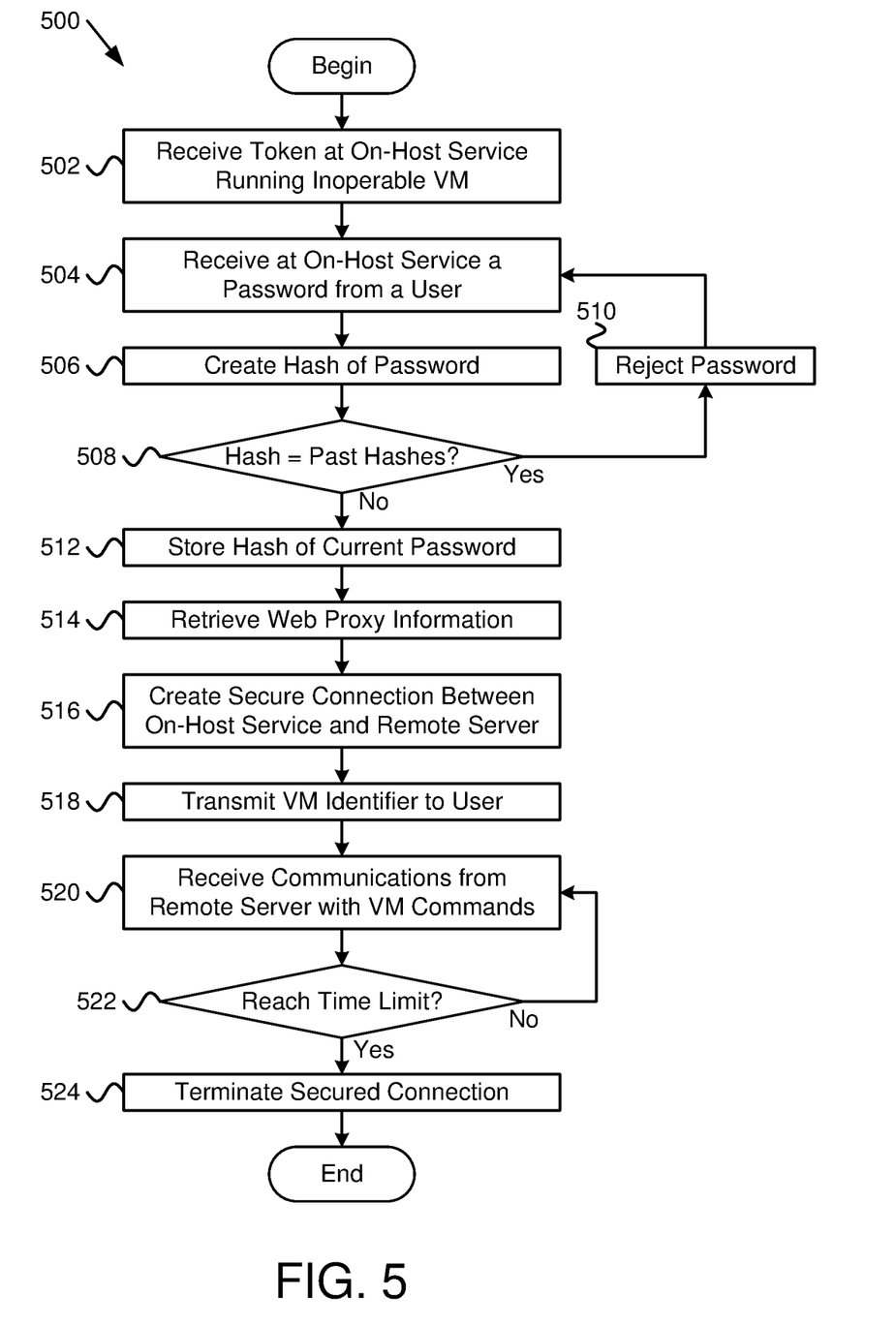
FIG. 5 is a schematic flow chart diagram illustrating another method for creation of a remote secured console over a secured connection for an inoperable VM, according to various embodiments.

FIG. 5 is a schematic flow chart diagram illustrating another method 500 for creation of a remote secured console over a secured connection for an inoperable VM, according to various embodiments. The method 500 begins and receives 502 a token at an on-host service 102 running on an inoperable VM 104 running on a server 106. The token is generated by a service person 120 located remote from the server 106. The method 500 receives 504, at the on-host service 102, a password from a user 112. The user has direct access to the on-host service 102 and the password is generated by the user 112.

The method 500 creates 506 a hash of the password and determines 508 if the hash of the password matches a hash of a previously used password. If the method 500 determines 508 that the hash of the password matches a hash of a previously used password, the method 500 rejects 510 the password and returns and receives 504 another password from the user 112. In some examples, the method 500 displays a message to the user 112 that the password is rejected because the password was used previously and prompts the user to create a new password.

If the method 500 determines 508 that the hash of the password does not match a hash of a previously used password, the method 500 stores 512 the hash of the password with other hashes of previously used passwords and optionally retrieves 514 web proxy information from a web proxy 110 between the on-host service 102 and a remote server 114 accessible to the service person 120 in cases where a web proxy 110 exists. The method 500 creates 516 a secured connection 118 between the on-host service 102 and the remote server 114. The secured connection 118 is created using the token and the password.

The method 500 transmits 518 a VM identifier to the user 112. The VM identifier is an identifier of the inoperable VM 104. The method 500 receives 520 communications from the remote server 114. The communications include one or more commands directed to the inoperable VM 104. The service person 120 accesses the on-host service 102 and the inoperable VM 104 using the VM identifier and the password. The password and the VM identifier are transmitted to the service person 120 by the user 112 via a channel 122 separate from the secured connection 118.

The method 500 determines 522 if a time limit has been reached where the time limit is a maximum amount of time that the secured connection 118 is allowed to exist and/or be open to communications. If the method 500 determines 522 that the time limit has not been reached, the method 500 continues to receive 520 communications from and send communications to the remote server 114. If the method 500 determines 522 that the time limit has been reached, the method 500 terminates 524 the secured connection 118, and the method 500 ends. In various embodiments, all or a portion of the method 500 is implemented using the token module 202, the password module 204, the connection module 206, the VM identifier module 208, the VM communications module 210, the web proxy module 302, the password hash module 304, and/or the timeout module 306.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   receiving a token at an on-host service running on an inoperable virtual machine ("VM") running on a server, the token generated by a service person located remote from the server;
   receiving, at the on-host service, a password from a user, the user having direct access to the on-host service;
   creating, by the on-host service, a secured connection between the on-host service and a remote server accessible to the service person, the secured connection created using the token and the password;
   transmitting a VM identifier of the inoperable VM to the user; and
   receiving communications from the remote server, the communications comprising one or more commands directed to the inoperable VM,
   wherein the service person accesses the on-host service and the inoperable VM using the VM identifier and the password, the password and the VM identifier transmitted to the service person by the user via a channel separate from the secured connection,
   wherein the channel separate from the secured connection comprises a voice connection and/or an electronic message, and
   wherein the service person transmits the token to the user and the user inputs the token to the on-host service, wherein the service person transmits the token using a voice connection and/or an electronic message.

2. The method of claim 1, wherein creating the secured connection further comprises using web proxy information regarding a web proxy between the inoperable VM and the remote server to create the secured connection.

3. The method of claim 1, wherein the secured connection comprises a WebSocket.

4. The method of claim 1, wherein the token is unique to the secured connection and the on-host service and the remote server use the token to encrypt communications over the secured connection.

5. The method of claim 1, further comprising storing a hash of previous passwords and rejecting the password generated by the user in response to a hash of the password matching a hash of a previous password.

6. The method of claim 1, wherein the service person accesses the remote server via a web browser accessing a webpage hosted by the remote server.

7. The method of claim 1, further comprising terminating the secured connection in response to reaching a time limit and/or reaching a time limit after a period inactivity on the secured connection.

8. The method of claim 1, wherein the user accesses the on-host service via a user interface through the server.

9. An apparatus comprising:
   a processor; and
   non-transitory computer readable storage media storing code, the code being executable by the processor to perform operations comprising:
   receiving a token at an on-host service running on an inoperable virtual machine ("VM") running on a server, the token generated by a service person located remote from the server;
   receiving, at the on-host service, a password from a user, the user having direct access to the on-host service;

creating, by the on-host service, a secured connection between the on-host service and a remote server accessible to the service person, the secured connection created using the token and the password;

transmitting a VM identifier of the inoperable VM to the user; and receiving communications from the remote server, the communications comprising one or more commands directed to the inoperable VM, wherein the service person accesses the on-host service and the inoperable VM using a VM identifier and the password, the password and the VM identifier transmitted to the service person by the user via a channel separate from the secured connection, wherein the channel separate from the secured connection comprises a voice connection and/or an electronic message, and wherein the service person transmits the token to the user and the user inputs the token to the on-host service, wherein the service person transmits the token using a voice connection and/or an electronic message.

10. The apparatus of claim 9, wherein creating the secured connection further comprises using web proxy information regarding a web proxy between the inoperable VM and the remote server to create the secured connection.

11. The apparatus of claim 9, wherein the secured connection comprises a WebSocket.

12. The apparatus of claim 9, wherein the token is unique to the secured connection and the on-host service and the remote server use the token to encrypt communications over the secured connection.

13. The apparatus of claim 9, the operations further comprising storing a hash of previous passwords and rejecting the password generated by the user in response to a hash of the password matching a hash of a previous password.

14. The apparatus of claim 9, wherein the service person accesses the remote server via a web browser accessing a webpage hosted by the remote server.

15. The apparatus of claim 9, the operations further comprising terminating the secured connection in response to reaching a time limit and/or reaching a time limit after a period inactivity on the secured connection.

16. A non-transitory computer readable storage medium storing code, the code being configured to be executable by a processor to perform operations comprising:

receiving a token at an on-host service running on an inoperable virtual machine ("VM") running on a server, the token generated by a service person located remote from the server;

receiving, at the on-host service, a password from a user, the user having direct access to the on-host service;

creating, by the on-host service, a secured connection between the on-host service and a remote server accessible to the service person, the secured connection created using the token and the password;

transmitting a VM identifier of the inoperable VM to the user; and receiving communications from the remote server, the communications comprising one or more commands directed to the inoperable VM, wherein the service person accesses the on-host service and the inoperable VM using the VM identifier and the password, the password and the VM identifier transmitted to the service person by the user via a channel separate from the secured connection, wherein the channel separate from the secured connection comprises a voice connection and/or an electronic message, and wherein the service person transmits the token to the user and the user inputs the token to the on-host service, wherein the service person transmits the token using a voice connection and/or an electronic message.

17. The non-transitory computer readable storage medium of claim 16, wherein creating the secured connection further comprises using web proxy information regarding a web proxy between the inoperable VM and the remote server to create the secured connection.

* * * * *